United States Patent
Zhou et al.

(10) Patent No.: US 9,832,147 B2
(45) Date of Patent: Nov. 28, 2017

(54) EMAIL SENDING AND RECEIVING METHOD AND TERMINAL

(71) Applicant: TENCENT TECHNOLOGY (SHENZHEN) COMPANY LIMITED, Shenzhen (CN)

(72) Inventors: Hao Zhou, Shenzhen (CN); Mingqiang Li, Shenzhen (CN); Xiaobing Wang, Shenzhen (CN); Qi Wang, Shenzhen (CN); Jiatao Xu, Shenzhen (CN); Liang Huang, Shenzhen (CN); Ziqun Huang, Shenzhen (CN); Jiahui Du, Shenzhen (CN); Zhiyuan Tan, Shenzhen (CN); Jianping Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 156 days.

(21) Appl. No.: 14/421,510

(22) PCT Filed: Jul. 23, 2013

(86) PCT No.: PCT/CN2013/079849
§ 371 (c)(1),
(2) Date: Feb. 13, 2015

(87) PCT Pub. No.: WO2014/026530
PCT Pub. Date: Feb. 20, 2014

(65) Prior Publication Data
US 2015/0222581 A1   Aug. 6, 2015

(30) Foreign Application Priority Data

Aug. 15, 2012 (CN) .......................... 2012 1 0290561

(51) Int. Cl.
*G06F 15/16* (2006.01)
*H04L 12/58* (2006.01)
*H04L 29/06* (2006.01)

(52) U.S. Cl.
CPC ............ *H04L 51/08* (2013.01); *H04L 51/063* (2013.01); *H04L 63/04* (2013.01)

(58) Field of Classification Search
None
See application file for complete search history.

(56) References Cited

U.S. PATENT DOCUMENTS

| 5,903,723 A * | 5/1999 | Beck ........................ G06F 17/22 |
| | | 707/999.01 |
| 8,615,553 B2 * | 12/2013 | Lucas ....................... A61L 2/10 |
| | | 709/206 |

(Continued)

FOREIGN PATENT DOCUMENTS

| CN | 1735077 A | 2/2006 |
| CN | 1809065 A | 7/2006 |

(Continued)

OTHER PUBLICATIONS

International Search Report dated Oct. 31, 2013 re: Application No. PCT/CN2013/079849.

(Continued)

*Primary Examiner* — Younes Naji
(74) *Attorney, Agent, or Firm* — Cantor Colburn LLP

(57) ABSTRACT

Disclosed are an email sending and receiving method and a terminal. The sending method comprises: submitting an email text, and packaging, by coding, the email text and a storing ID of an enclosure uploaded in advance; determining whether an email receiver is a local domain account, and if yes, storing the email into a storage server; otherwise, obtaining the enclosure from the storage server according to the storing ID of the enclosure, recoding the enclosure and (Continued)

the email text into an email and then sending the email to an out-of-band server.

9 Claims, 10 Drawing Sheets

(56) References Cited

U.S. PATENT DOCUMENTS

| | | | |
|---|---|---|---|
| 2003/0046352 A1* | 3/2003 | Katsuda | H04N 1/00209 709/206 |
| 2004/0186894 A1* | 9/2004 | Jhingan | G06Q 10/107 709/207 |
| 2005/0052692 A1* | 3/2005 | Buschi | G06Q 10/107 358/1.15 |
| 2005/0188026 A1* | 8/2005 | Hilbert | H04L 51/063 709/206 |
| 2009/0183257 A1* | 7/2009 | Prahalad | G06F 21/6218 726/22 |
| 2009/0248808 A1* | 10/2009 | Izumi | G06Q 10/107 709/206 |

FOREIGN PATENT DOCUMENTS

| | | |
|---|---|---|
| CN | 1906616 A | 7/2007 |
| CN | 101547165 A | 9/2009 |
| CN | 102025647 A | 4/2011 |
| JP | 2007251554 A | 9/2007 |
| JP | 2008242726 A | 10/2008 |

OTHER PUBLICATIONS

International Preliminary Report on Patentability dated Feb. 26, 2015 re: Application No. PCT/CN2013/079849.

Japanese Office Action dated Jan. 19, 2016 re: Application No. 2015-526861; pp. 1-12.

Canadian Office Action dated May 10, 2016 re: Application No. 2,881,926; pp. 1-6.

* cited by examiner

EMAIL SENDING AND RECEIVING METHOD AND TERMINAL

CROSS REFERENCE TO RELATED APPLICATION

This application claims the priority of Chinese patent application No. 201210290561.0, filed in the Patent Office of the People's Republic of China on Aug. 15, 2012, entitled "Method and Terminal for Sending and Receiving Email", the entire contents of which are incorporated herein by reference.

TECHNICAL FIELD

The application relates to internet technologies, and more particularly, to a method and a terminal for sending and receiving an email.

BACKGROUND

An email usually includes a mail body and an attachment. Email processing includes attachment uploading and downloading, as well as mail sending, receiving and storage, etc.

At present, in a method for email processing, the attachment uploading means that a local file is directly uploaded to a server with a streaming protocol. When sending a mail, the server encodes the file uploaded by a user, together with the mail body, into one file (namely, an eml file) through a standard encoding format, and then sends the encoded eml file through a standard smtp protocol. When receiving a mail, the server stores the received mail (namely, the encoded eml file) directly.

SUMMARY

Embodiments of the application provide a method and a terminal for sending and receiving an email, so as to save network resources.

A method for sending an email is provided by an embodiment of the application, which includes:

submitting a mail body;

packaging the mail body and a storage ID of an attachment pre-uploaded into a mail by encoding;

determining whether a recipient of the mail is a local domain account number; and when determining that the recipient of the mail is the local domain account number, storing the mail in a storage server;

when determining that the recipient of the mail is not the local domain account number, obtaining the attachment from the storage server based on the storage ID of the attachment, and sending a mail to an external domain server, after the attachment and the mail body are re-encoded into the mail;

wherein the local domain account number is an internal account number of a local mail-box system.

A terminal for sending an email is also provided by an embodiment of the application, which includes a memory and a processor, wherein the memory stores instructions executable for the processor, and the instructions of the memory are stored in a plurality of modules including:

a mail packaging module, configured to submit a mail body, and package the mail body and a storage ID of an attachment pre-uploaded into a mail by encoding;

a determining module, configured to determine whether a recipient of the mail is a local domain account number;

a first storing module, configured to store the mail in a storage server when the recipient of the mail is the local domain account number; and a sending module, when the recipient of the mail is an external domain account number, configured to obtain the attachment from the storage server based on the storage ID of the attachment, and to send a mail to an external domain server after re-encoding the attachment and the mail body into the mail;

wherein the local domain account number is an internal account number of a local mail-box system.

A terminal for receiving an email is also provided by an embodiment of the application, which includes a memory and a processor, wherein the memory stores instructions executable for the processor, and the instructions of the memory are stored in a plurality of modules including:

a first receiving module, configured to receive a mail sent by an external domain server;

a parsing module, configured to parse the mail, obtain a mail body and an attachment of the mail; and a second storing module, configured to store the mail body and the attachment separately in a storage server.

It can be seen that, the embodiments of the application provide a method and a terminal for sending and receiving an email, in which a mail body and an attachment are stored separately. When a mail is sent to a local domain account number, the attachment is unnecessary to be sent together, which may greatly save network bandwidth. After receiving the mail, a user may learn basic information of the attachment by extracting the mail body as needed. Subsequently, attachment decoding and transmission may be omitted, mail reading speed may be improved, and network resources may also be saved. In addition, when uploading an attachment, repetition of a same attachment can be effectively eliminated on the basis of whether the attachment has been stored in a storage server, thereby saving storage space.

EMBODIMENTS OF THE INVENTION

To enable technical solutions and advantages of the application more clear, detailed description of the application will be given in the following accompanying with attached figures and embodiments.

An existing mail processing method may have the following deficiencies:

1. a file which is already stored by a server cannot be effectively utilized, which is a waste of time and network resources;

2. by adopting a method of packaging and sending a whole mail, network bandwidth may be wasted; and 3. by adopting a method of packaging and storing a whole mail, a same file is stored repeatedly, which is a waste of storage space of a storage server.

To solve the above problems, technical solutions provided by embodiments of the application are mainly as follows. A mail body and an attachment are stored separately. When sending a mail to a local domain account number, namely, a local mail-box system internal account number, which is also known as an internal domain account number, the attachment is unnecessary to be sent together with the mail, so as to save network bandwidth. After receiving the mail, a user may learn basic information of the attachment by extracting the mail body as needed, so as to improve mail reading speed and save network resources. In addition, when uploading the attachment, repetition of a same attachment can be effectively eliminated on the basis of whether the attachment is already stored in a storage server, that is, the same attachment is uploaded and stored only once, thereby saving storage space of a terminal.

Figure 1A:
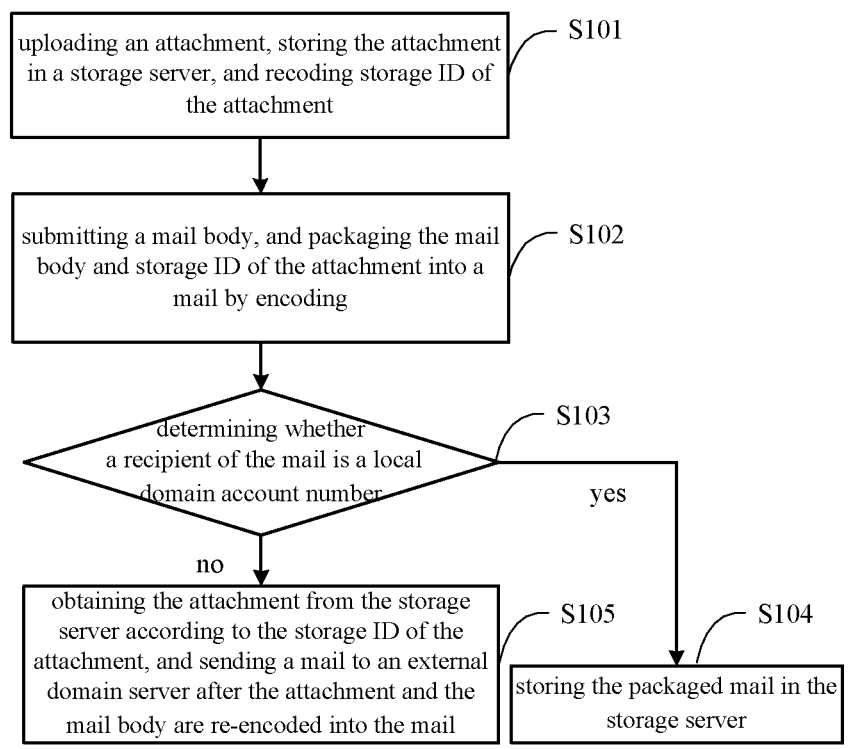
FIG. 1a is a flowchart illustrating a method for sending an email provided by an embodiment of the application.

FIG. 1a is a flowchart illustrating a method for sending an email provided by an embodiment of the application. As shown in FIG. 1a, the method includes the follows.

Step S101, uploading an attachment, storing the attachment in a storage server, and recording storage ID of the attachment.

Specifically speaking, the attachment is uploaded on a terminal browser. The uploaded attachment is stored in a local storage server. At the same time, the storage ID of the attachment in the storage server is recoded. The storage ID is a storage index number of the uploaded attachment in the storage server, so as to facilitate to search for a corresponding attachment in the storage server subsequently, based on the storage ID of the attachment. For example, the attachment can be encoded by adopting an MD5 encoding algorithm. An encoded character string is taken as a unique identification of the attachment, that is, the storage ID of the attachment.

Step S102, submitting a mail body, packaging the mail body and storage ID of the attachment into a mail by encoding.

Specifically speaking, when needing to send a mail, mail body and storage IDs of all the attachments are packaged into a mail by using an optimized mail-encoding protocol. The mail body includes basic information of the attachment. The basic information includes file name and size of the attachment, the storage ID of the attachment, and so on.

Step S103, determining whether a recipient of the mail is a local domain account number, if yes, proceeding with step S104; otherwise, proceeding with step S105.

The local domain account number means an internal account number of a local mail-box system, namely, an internal domain account number. For example, as for an employee of Tencent company, the account number @qq.com of internal mail-box system of Tencent company is a local domain account number. Account numbers other than the local domain account number are called external account numbers. For example, an account number of Netease mail-box system is @163.com, etc.

Step S104, storing the packaged mail in the storage server.

Step S105, obtaining the attachment from the storage server according to the storage ID of the attachment, and sending a mail to an external domain server after the attachment and the mail body are re-encoded into the mail.

In the embodiment of the application, the attachment and the mail body are stored separately, and processed respectively on the basis of whether the recipient of the mail is the local domain account number or the external domain account number. When the recipient of the mail is the local domain account number, the packaged mail is directly stored in the storage server. The mail is formed by encoding the mail body and the storage ID of the attachment. When the recipient of the mail is an external domain account number, the attachment is obtained from the storage server according to the storage ID of the attachment. And then, the mail body and the attachment are re-encoded into a mail by using a common mail encoding protocol. Subsequently, the mail is delivered to an external domain server.

In the embodiment of the application, by storing the attachment and the mail body separately, for the mail being sent to the internal domain account number, the attachment does not need to be included in the data being transferred during an entire process of sending and delivering, subsequently, the network bandwidth may be greatly saved.

Figure 1B:
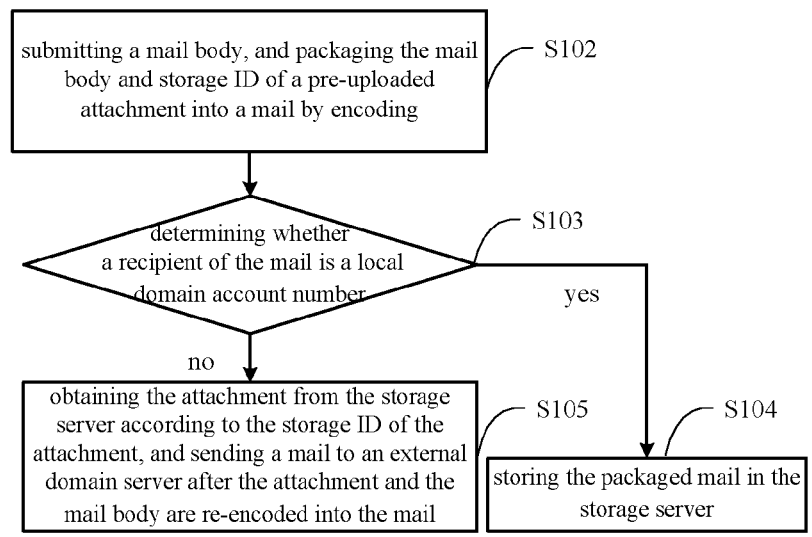
FIG. 1b is a flowchart illustrating a method for sending an email provided by an embodiment of the application.

It should be noted that step S101 of the above-mentioned embodiment also can be omitted in other embodiment, as shown in FIG. 1b. At this point, the attachment is pre-uploaded. The uploaded attachment is stored in the storage server, and the storage ID of the attachment is recorded at the same time.

Figure 2:
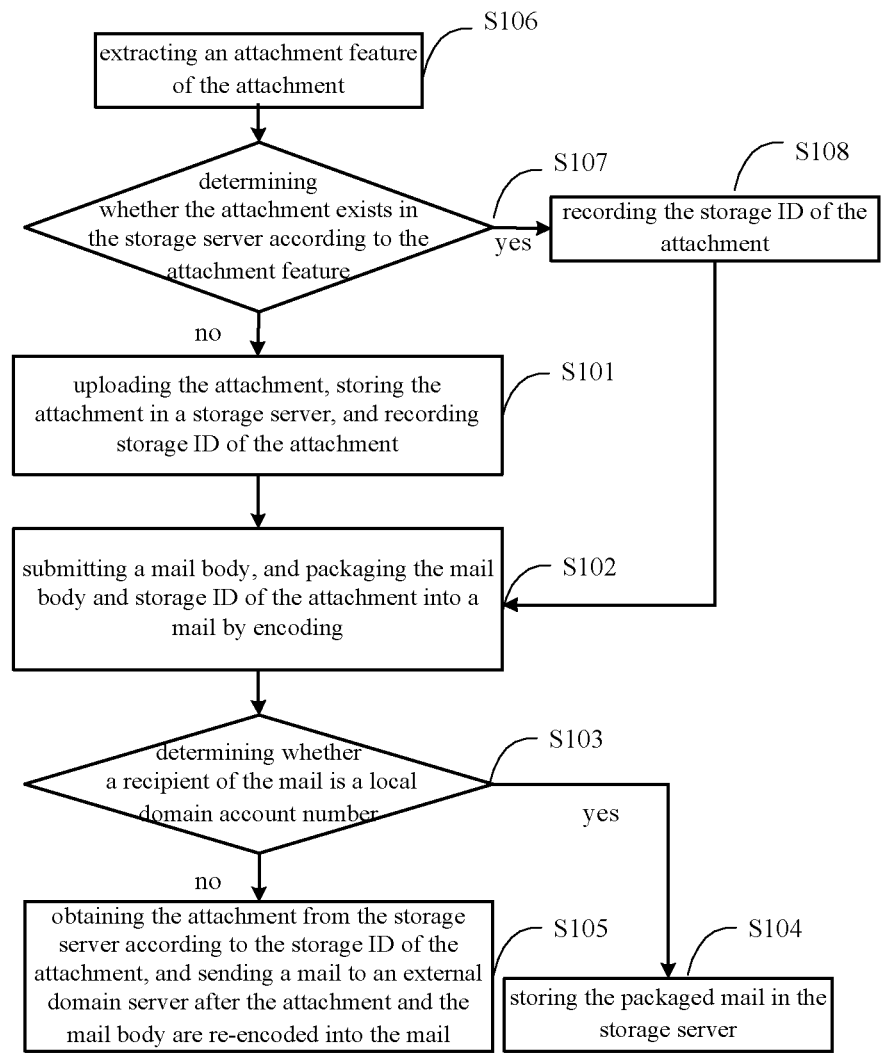
FIG. 2 is a flowchart illustrating a method for sending an email provided by an embodiment of the application.

FIG. 2 is a flowchart illustrating a method for sending an email provided by an embodiment of the application. As shown in FIG. 2, based on the above-mentioned embodiment shown in FIG. 1a, before step S101, the method further includes the follows.

Step S106, extracting an attachment feature of the attachment.

Step S107, determining whether the attachment exists in the storage server according to the attachment feature; when determining that the attachment exists in the storage server, proceeding with step S108; otherwise, proceeding with step S101.

Step S108, recording the storage ID of the attachment, and proceeding with step S102.

A difference between the embodiment of the application and the embodiment illustrated with FIG. 1a is as follows. In the embodiment of the application, when uploading an attachment, a process of eliminating repetition needs to be performed on the attachment to be uploaded, that is, the same attachment is uploaded only once.

Specifically speaking, when the attachment is uploaded, the attachment feature of the attachment is extracted from the attachment. The attachment feature may be the file name of the attachment, the storage ID of the attachment (such as an MD5 encoding character string of the attachment), etc. The storage server may be searched based on the attachment feature of the attachment, so as to determine whether the attachment is already stored in the storage server. When determining that the attachment is already stored in the storage server, the storage ID of the attachment in the storage server is recorded. When determining that the attachment is not stored in the storage server, the attachment is directly uploaded and stored, and the storage ID of the attachment is recorded in the storage server. When determining whether the attachment that needs to be searched out is already stored in the storage server, based on the attachment feature of the attachment, such as the storage ID of the attachment, e.g., the MD5 encoding character string, and so on, searching in the storage server to determine whether an attachment corresponding to the storage ID of the attachment, namely, the MD5 encoding character string, in the storage server. When determining that there is the attachment corresponding to the storage ID of the attachment in the storage server, it indicates that the attachment exists in the storage server, otherwise, it indicates that the attachment does not exist in the storage server.

Based on the above-mentioned embodiment illustrated with FIG. 1a, a process of eliminating repetition needs to be performed on the attachment in the embodiment of the application. Furthermore, whether the attachment to be uploaded already exists in the storage server needs to be determined. When determining that the attachment to be uploaded already exists in the storage server, the attachment is unnecessary to be uploaded repeatedly. Subsequently, the process of attachment uploading may be omitted, and the network resources may be saved.

Figure 3:
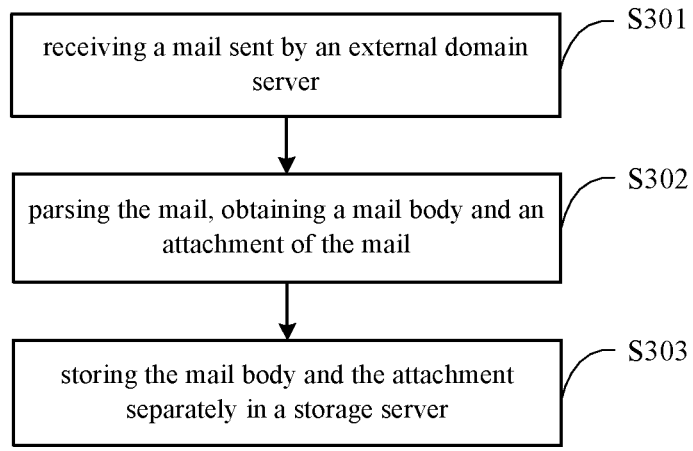
FIG. 3 is a flowchart illustrating a method for receiving an email provided by an embodiment of the application.

FIG. 3 is a flowchart illustrating a method for receiving an email provided by an embodiment of the application. As shown in FIG. 3, the method includes the follows.

Step S301, receiving a mail sent by an external domain server.

Step S302, parsing the mail, obtaining a mail body and an attachment of the mail.

Step S303, storing the mail body and the attachment separately in a storage server.

In the embodiment of the application, the received mail body and attachment are stored separately. Only basic information of the attachment is reserved in the mail body. The basic information includes file name and size of the attachment, and the storage ID of the attachment in the storage server, and so on. When the attachment exists in the storage server, there is no need to store the attachment repeatedly.

In the embodiment of the application, elimination of attachment repetition may be realized by the above solution, and the storage space is saved.

Figure 4:
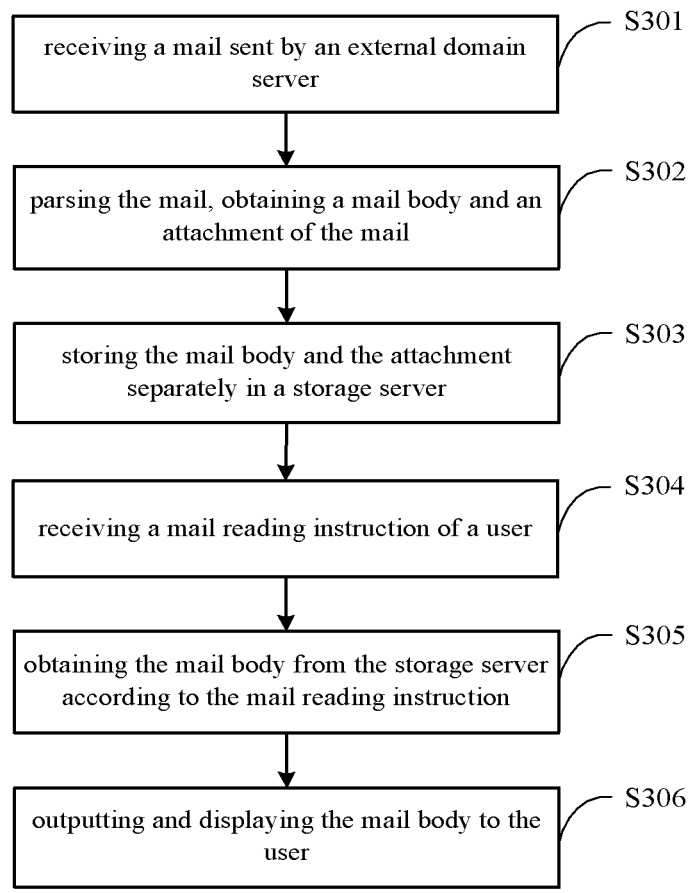
FIG. 4 is a flowchart illustrating a method for receiving an email provided by an embodiment of the application.

FIG. 4 is a flowchart illustrating a method for receiving an email provided by an embodiment of the application. As shown in FIG. 4, based on the above-mentioned embodiment illustrated with FIG. 3, after step S303 described above, the method further includes the follows.

Step S304, receiving a mail reading instruction of a user.

Step S305, obtaining the mail body from the storage server according to the mail reading instruction.

Step S306, outputting and displaying the mail body to the user.

A difference between the embodiment of the application and the embodiment illustrated with FIG. 3 is as follows. In the embodiment of the application, based on a user requirement, the received mail body may be output to and displayed for the user, which can enable the user to read the mail body.

In the embodiment of the application, when reading a mail, a user is only necessary to extract the mail body from the storage server. The basic information of the attachment is included in the mail body, subsequently, information, such as file name and size of the attachment, etc, may be displayed to the user at the same time. Therefore, attachment decoding and transmission may be omitted, mail reading speed may be improved, and network resources may be saved.

Figure 5A:
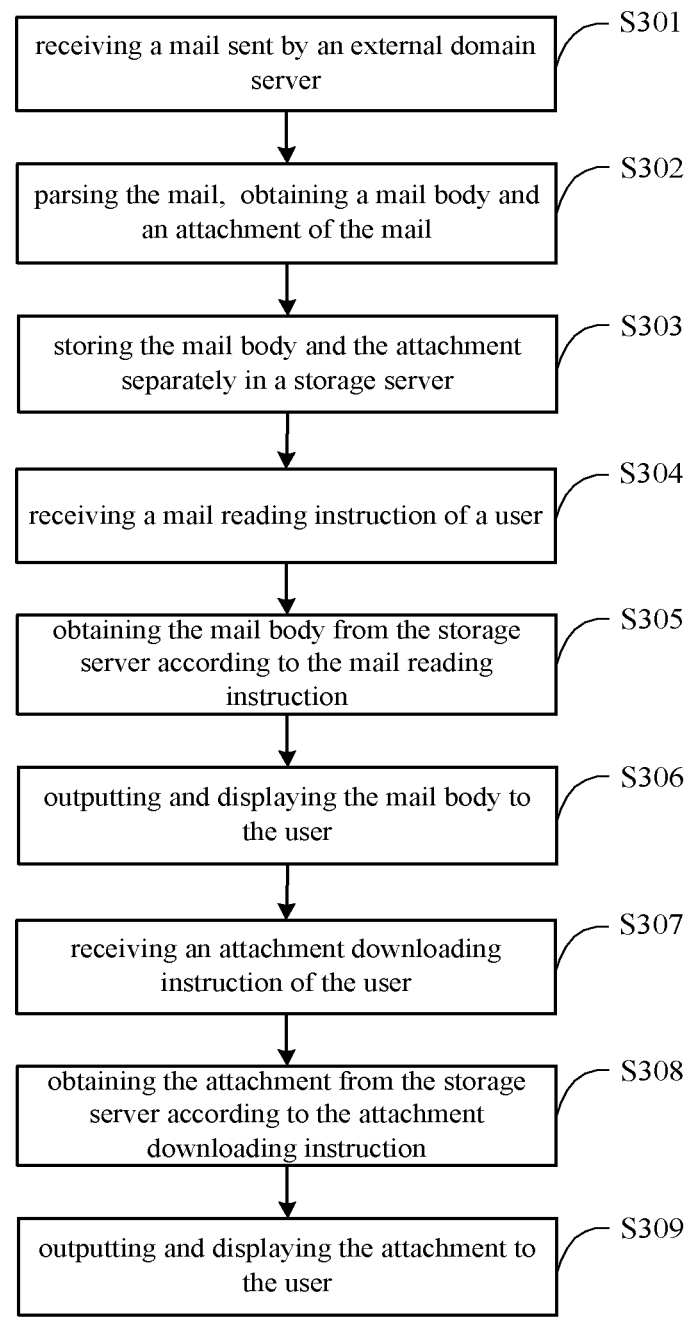
FIG. 5a is a flowchart illustrating a method for receiving an email provided by an embodiment of the application.

FIG. 5a is a flowchart illustrating a method for receiving an email provided by an embodiment of the application. As shown in FIG. 5a, based on the above-mentioned embodiment illustrated with FIG. 4, after step S306 described above, the method further includes the follows.

Step S307, receiving an attachment downloading instruction of the user.

Step S308, obtaining the attachment from the storage server according to the attachment downloading instruction.

Step S309, outputting and displaying the attachment to the user.

In the embodiment of the application, based on the above-mentioned embodiment illustrated with FIG. 4, according to the user requirement, the received attachment may be downloaded, and the downloaded attachment is output and displayed to the user, which can enable the user to download the attachment when reading the mail body, so as to meet different requirements of the user and provide the user with a convenience.

In addition, the above scheme of attachment downloading shown in FIG. 5a may be implemented by combining with the embodiment shown in FIG. 3 rather than that shown in FIG. 4, that is, the mail body is not displayed and the attachment is downloaded directly.

Figure 5B:
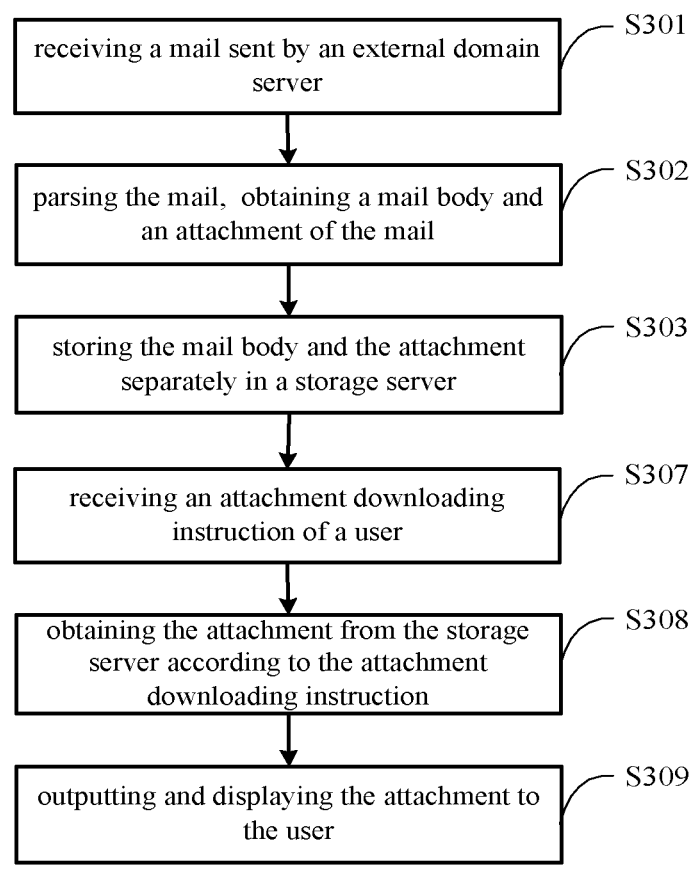
FIG. 5b is a flowchart illustrating a method for receiving an email provided by an embodiment of the application.

Specifically speaking, FIG. 5b is a flowchart illustrating a method for receiving an email provided by an embodiment of the application. As shown in FIG. 5b, based on the above-mentioned embodiment shown in FIG. 3, after step S303 described above, the method further includes the follows.

Step S307, receiving an attachment downloading instruction of a user.

Step S308, obtaining the attachment from the storage server according to the attachment downloading instruction.

Step S309, outputting and displaying the attachment to the user.

In the embodiment of the application, based on the above-mentioned embodiment shown in FIG. 3, according to a user requirement, the received attachment may be downloaded, and the downloaded attachment may be output and displayed to the user, which can enable the user to download the attachment directly according to an email topic option without reading the mail body, so as to meet different requirements of the user and provide the user with a convenience.

In the process of specific implementation, a mail name and an attachment option may be set in a mail subject line. The attachment option provides an entry for downloading the attachment before the user opens the mail body, which facilitates the user's operation of the mail by storing the mail body and the attachment separately.

Figure 6A:
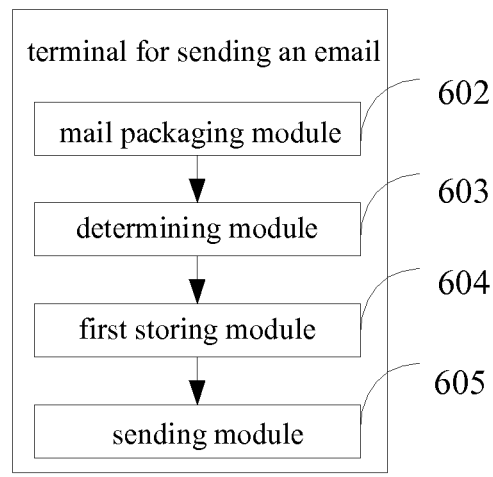
FIG. 6a is a schematic diagram illustrating structure of a terminal for sending an email provided by an embodiment of the application.

FIG. 6a is a schematic diagram illustrating structure of a terminal for sending an email provided by an embodiment of the application. As shown in FIG. 6a, the terminal includes a mail packaging module 602, a determining module 603, a first storing module 604 and a sending module 605.

The mail packaging module 602 is configured to submit a mail body, and package the mail body and a storage ID of a pre-uploaded attachment into a mail by encoding.

Specifically, when needing to send the mail, the mail body and storage IDs of all the attachments are packaged into a mail by using an optimized mail-encoding protocol. The mail body includes basic information of the attachment. The basic information includes file name and size of the attachment, the storage ID of the attachment, and so on.

The determining module 603 is configured to determine whether a recipient of the mail is a local domain account number.

The first storing module 604 is configured to store the packaged mail in a storage server, when the recipient of the mail is the local domain account number.

When the recipient of the mail is an external domain account number, the sending module 605 is configured to obtain the attachment from the storage server according to the storage ID of the attachment, and to send a mail to an external domain server after re-encoding the attachment and the mail body into the mail.

The local domain account number means an internal account number of a local mail-box system, namely, an internal domain account number. For example, as for an employee of Tencent company, the account number @qq.com of internal mail-box system of Tencent company is a local domain account number. Account numbers other than the local domain account number are called external domain account numbers. For example, an account number of Netease mail-box system is @163.com, etc.

Figure 6B:
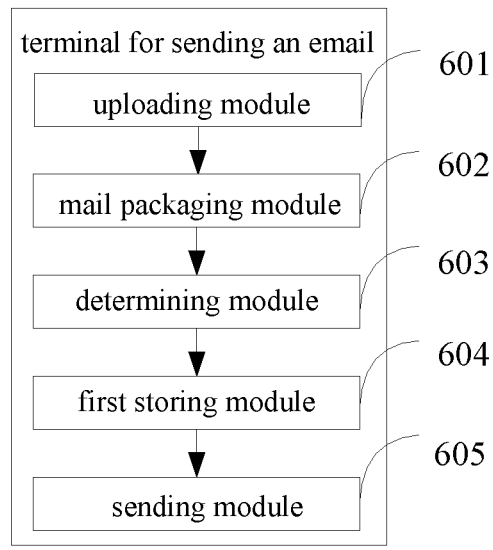
FIG. 6b is a schematic diagram illustrating structure of a terminal for sending an email provided by an embodiment of the application.

As shown in FIG. 6b, the terminal for sending the email may also include an uploading module 601, which is configured to upload the attachment, store the attachment in the storage server, and record the storage ID of the attachment.

Specifically, the attachment is uploaded on a terminal browser. The uploaded attachment is stored in a local storage server, and at the same time the storage ID of the attachment in the storage server is recoded. The storage ID is a storage index number of the uploaded attachment in the storage server, such as an MD5 encoding character string of the attachment, so that a corresponding attachment can be searched out from the storage server subsequently, according to the storage ID of the attachment.

In the embodiment of the application, the attachment and the mail body are stored separately, and processed respectively on the basis of whether the recipient of the mail is the local domain account number or the external domain account number. When the recipient of the mail is the local domain account number, the packaged mail is stored in the storage server. The mail is formed by encoding the mail body and the storage ID of the attachment. When the recipient of the mail is an external domain account number, the attachment is obtained from the storage server according to the storage ID of the attachment, and the mail body and the attachment are re-encoded into a mail by using a common mail encoding protocol, and then the mail is delivered to an external domain server.

In the embodiment of the application, by storing the attachment and the mail body separately, for the mail being sent to the internal domain account number, the attachment does not need to be included in the data being transferred during an entire process of sending and delivering, subsequently, the network bandwidth can be greatly saved.

It should be noted that, in other embodiment, the process of uploading the attachment, storing the attachment in the storage server and recoding the storage ID of the attachment in the above embodiment may also be completed by the uploading module 601 in advance.

Further, the uploading module 601 is also configured to extract an attachment feature of the attachment, determine whether the attachment exists in the storage server according to the attachment feature, and to record the storage ID of the attachment when the attachment exists in the storage server, otherwise, the uploading module 601 is further configured to upload and store the attachment directly, and record the storage ID of the attachment in the storage server.

In the embodiment of the application, when uploading the attachment, a process of eliminating repetition needs to be performed on the uploaded attachment, that is, the same attachment is uploaded only once.

Specifically, when the attachment is uploaded, the attachment feature of the attachment is extracted from the attachment. The attachment feature may be the file name of the attachment, the storage ID of the attachment (such as an MD5 encoding character string of the attachment), etc. Based on the attachment feature, the storage server is searched, so as to determine whether the attachment exists in the storage server. When determining that the attachment exists in the storage server, the storage ID of the attachment in the storage server is recorded. When determining that the attachment does not exist in the storage server, the attachment is uploaded and stored, and the storage ID of the attachment in the storage server is recorded. During the process of determining whether the attachment searched for exists in the storage server, based on the attachment feature of the attachment, such as the storage ID of the attachment like the MD5 encoding character string, an attachment corresponding to the storage ID of the attachment, e.g., the MD5 encoding character string, is searched for in the storage server. When the attachment corresponding to the storage ID of the attachment is searched out in the storage server, it indicates that the attachment exists in the storage server, otherwise, it indicates that the attachment does not exist in the storage server.

In the embodiment of the application, by eliminating repetition of the attachment, whether the attachment to be uploaded exists in the storage server may be further determined. When the attachment to be uploaded already exists in the storage server, the attachment is unnecessary to be re-uploaded. Subsequently, the process of attachment uploading may be omitted, and the network resources may be saved.

Figure 6C:
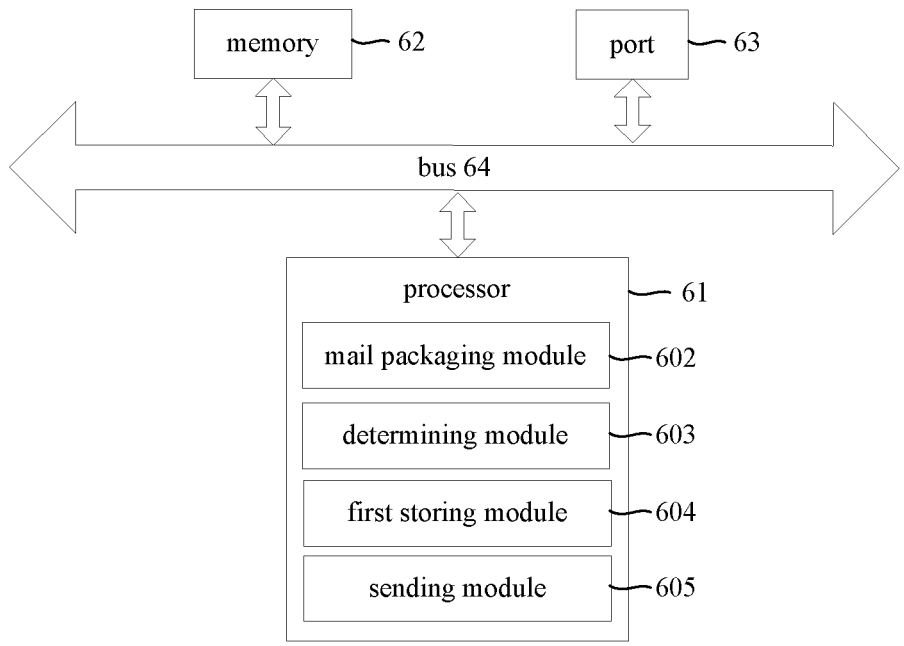
FIG. 6c is a schematic diagram illustrating hardware structure of a terminal for sending an email provided by an embodiment of the application.

FIG. 6c is a schematic diagram illustrating a hardware structure of a terminal for sending an email provided by an embodiment of the present invention. As shown in FIG. 6c, the terminal includes a processor 61, a memory 62, at least one port 63 and a bus 64. The processor 61, the memory 62 and the at least one port 63 are connected with each other via the bus 64.

The memory 62 stores machine readable instructions.

The processor 61 executes the machine readable instructions to perform following operations:

submitting a mail body, and packaging the mail body and a storage ID of a pre-uploaded attachment into a mail by encoding;

determining whether a recipient of the mail is a local domain account number; and storing the packaged mail in a storage server when the recipient of the mail is the local domain account number; and obtaining, according to the storage ID of the attachment, the attachment from the storage server when the recipient of the mail is an external domain account number, and sending a mail to an external domain server via the port 63 after the attachment and the mail body are re-encoded into the mail.

The processor 61 executes the machine readable instructions to further perform following operations:

uploading the attachment, storing the attachment in the storage server, and recording the storage ID of the attachment.

The processor 61 executes the machine readable instructions to further perform following operations:

extracting an attachment feature of the attachment; determining whether the attachment exists in the storage server according to the attachment feature; and recording the storage ID of the attachment when the attachment exists in the storage server; otherwise, uploading and storing the attachment, and recording the storage ID of the attachment in the storage server.

Figure 6D:
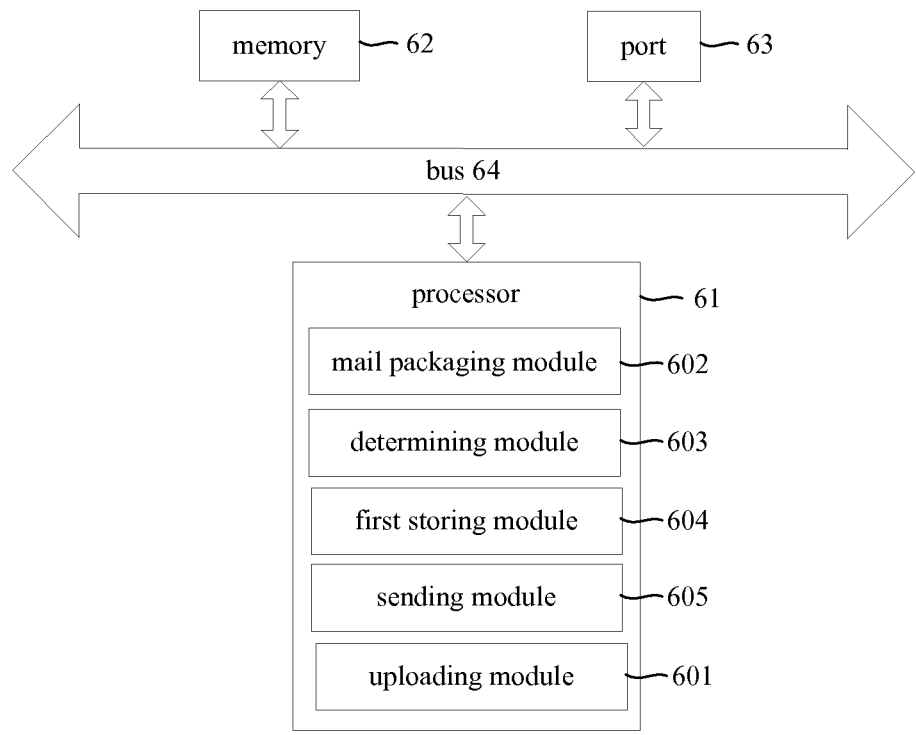
FIG. 6d is a schematic diagram illustrating hardware structure of a terminal for sending an email provided by an embodiment of the application.

It can be seen that, when the machine readable instructions stored in the memory 62 are executed by the processor 61, functions of the mail packaging module 602, the determining module 603, the first storing module 604 and the sending module 605 shown in FIG. 6c, as well as functions of the uploading module 601 shown in FIG. 6d, may be implemented.

Figure 7A:
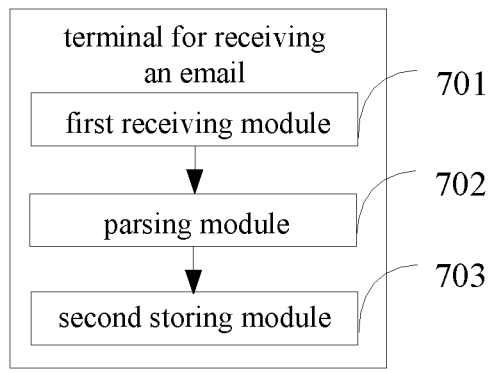
FIG. 7a is a schematic diagram illustrating structure of a terminal for receiving an email provided by an embodiment of the application.

FIG. 7a is a schematic diagram illustrating structure of a terminal for receiving an email provided by an embodiment of the application. As shown in FIG. 7a, the terminal includes a first receiving module 701, a parsing module 702 and a second storing module 703.

The first receiving module 701 is configured to receive a mail sent by an external domain server.

The parsing module 702 is configured to parse the mail and obtain a mail body and an attachment of the mail.

The second storing module 703 is configured to store the mail body and the attachment separately in a storage server.

In the embodiment of the application, the received mail body and attachment are stored separately. Only basic information of the attachment is reserved in the mail body. The basic information includes file name and size of the attachment, as well as the storage ID of the attachment in the storage server, and so on. When the attachment exists in the storage server, there is no need to store the attachment repeatedly.

In the embodiment of the application, elimination of attachment repetition may be realized by the above solution, and the storage space is saved.

Figure 7B:
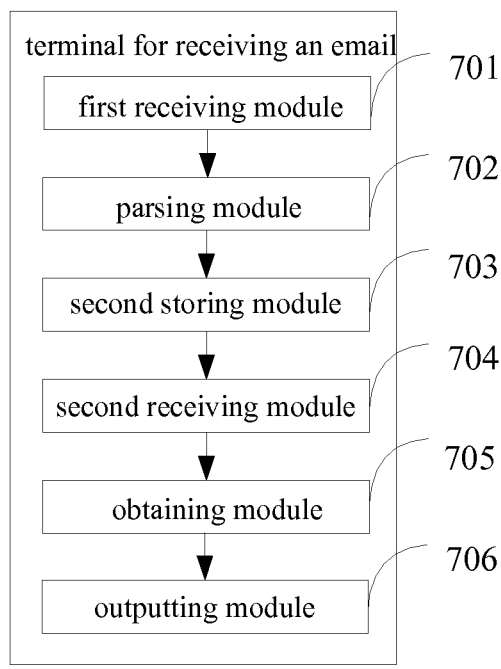
FIG. 7b is a schematic diagram illustrating structure of a terminal for receiving an email provided by an embodiment of the application.

As shown in FIG. 7b, the terminal for receiving an email provided by an embodiment of the application may also include:

a second receiving module 704, configured to receive a mail reading instruction of a user;

an obtaining module 705, configured to obtain the mail body from the storage server according to the mail reading instruction; and an outputting module 706, configured to output and display the mail body to the user.

In the embodiment of the application, the received mail body may be output and displayed to a user according to a user requirement, which may enable the user to read the mail body.

In the embodiment of the application, when a user reads a mail, the mail body is extracted from the storage server. The mail body includes basic information of the attachment. Subsequently, the information, such as file name and size of the attachment, etc, may be displayed to the user at the same time. Therefore, attachment decoding and transmission may be omitted, mail reading speed may be improved, and network resources may also be saved.

Further, the second receiving module 704 is also configured to receive an attachment downloading instruction of a user;

the obtaining module 705 is also configured to obtain the attachment from the storage server according to the attachment downloading instruction; and the outputting module 706 is also configured to output and display the attachment to the user.

In the above solution provided by the embodiment of the application, according to the user requirement, the received attachment may be downloaded, and the downloaded attachment is output and displayed to the user, which can enable the user to download the attachment when reading the mail body, so as to meet different requirements of the user and provide the user with a convenience.

In addition, the attachment downloading scheme in the above embodiment of the application may also be independent of mail-body displaying scheme, that is, the attachment may be downloaded without displaying the mail body. Specifically, based on the above-mentioned embodiment shown in the FIG. 7a, the terminal for receiving the email may also include: the second receiving module 704, configured to receive an attachment downloading instruction of a user; the obtaining module 705, configured to obtain the attachment from the storage server according to the attachment downloading instruction; and the outputting module 706, configured to output and display the attachment to the user. At this point, the structure diagram of the sending terminal may still be as shown in FIG. 7b, however, the second receiving module 704, the obtaining module 705 and the outputting module 706 thereof do not perform the operations of receiving the mail reading instruction of the user, obtaining the mail body from the storage server according to the mail reading instruction, and outputting and displaying the mail body to the user. In the embodiment of the application, according to the user requirement, the received attachment may be downloaded, and the downloaded attachment may be output and displayed to the user, which can enable the user to download the attachment according to an email topic option without reading the mail body, so as to meet different requirements of the user and provide the user with a convenience. In the process of specific implementation, a mail name and an attachment option may be set in a mail subject line. The attachment option provides an entry for downloading the attachment before the user opens the mail body, which facilitates the user's operation of the mail by storing the mail body and the attachment separately.

Figure 7C:
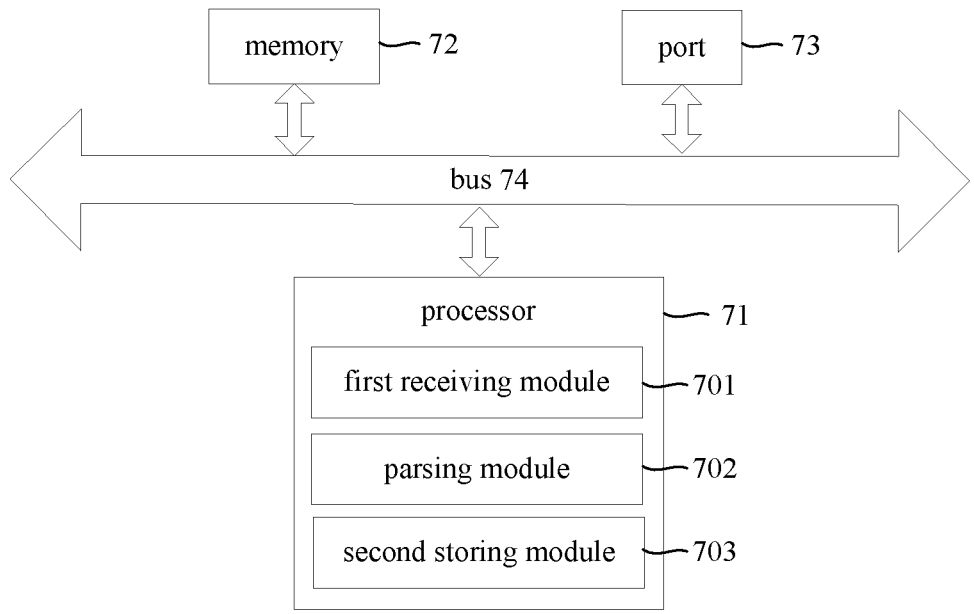
FIG. 7c is a schematic diagram illustrating hardware structure of a terminal for receiving an email provided by an embodiment of the application.

FIG. 7c is a schematic diagram illustrating a hardware structure of a terminal for receiving an email provided by an embodiment of the application. As shown in FIG. 7c, the terminal includes a processor 71, a memory 72, at least one port 73 and a bus 74. The processor 71, the memory 72 and the at least one port 73 are connected with each other via the bus 74.

The memory 72 stores machine readable instructions.

The processor 71 executes the machine readable instructions to perform following operations:

receiving a mail sent by an external domain server through the port 73;

parsing the mail, and obtaining a mail body and an attachment of the mail; and storing the mail body and the attachment separately in a storage server.

The processor 71 executes the machine readable instructions to further perform following operations:

receiving a mail reading instruction of a user through the port 73;

obtaining the mail body from the storage server according to the mail reading instruction; and outputting and displaying the mail body to the user.

The processor 71 executes the machine readable instructions to further perform following operations:

receiving an attachment downloading instruction of a user through the port 73;

obtaining the attachment from the storage server according to the attachment downloading instruction; and outputting and displaying the attachment to the user.

Figure 7D:
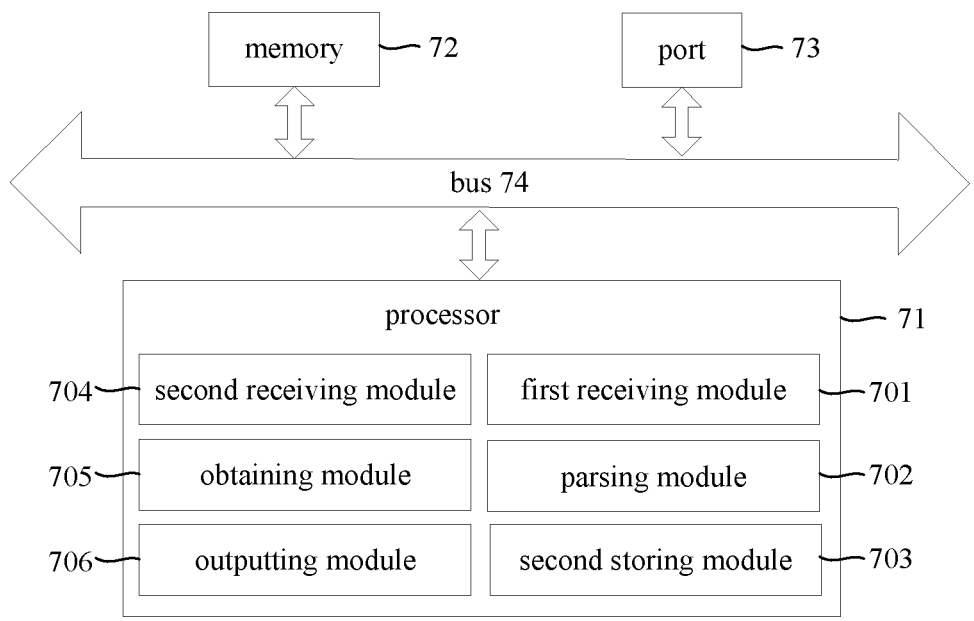
FIG. 7d is a schematic diagram illustrating hardware structure of a terminal for receiving an email provided by an embodiment of the application.

It can be seen that, when the machine readable instructions stored in the memory 72 are executed by the processor 71, functions of the first receiving module 701, the parsing module 702 and the second storing module 703 shown in FIG. 7c, as well as functions of the second receiving module 704, the obtaining module 705 and the outputting module 706 shown in FIG. 7d, may be implemented.

The modules provided by the embodiments of the application may be integrated together or deployed separately, and may be combined into one module, or may be further divided into multiple sub modules.

In the method and terminal for sending and receiving an email provided by embodiments of the application, a mail body and an attachment are stored separately. When sending a mail to a local domain account number, the attachment is unnecessary to be carried and sent, thereby greatly saving network bandwidth. After receiving the mail, a user may learn basic information of the attachment by extracting the mail body as needed. Subsequently, attachment decoding and transmission may be omitted, mail reading speed may be improved, and network resources may be saved. In addition, when uploading an attachment, repetition of a same attachment can be effectively eliminated on the basis of whether the attachment has been stored in a storage server, thus saving storage space of the terminal.

Each module provided by the embodiments of the application may be implemented by software (such as the machine readable instructions stored in the memory and executed by the processor), or may also be implemented by hardware (such as a processor of application specific integrated circuit (ASIC)), or may be implemented by combining the software and the hardware, which is not limited in the embodiments of the application. For example, a hardware module may include a permanent circuit or a logical device (such as a dedicated processor like field-programmable gate array (FPGA) or ASIC) specially designed to complete specific operations. The hardware module may also include a programmable logic device or circuit (such as including a general processor or other programmable processor) temporarily configured by the software to perform specific operations. The implementation of hardware module by adopting a mechanical way, or a special permanent circuit, or a circuit temporarily configured (such as configured by the software), is determined based on a consideration of cost and time.

One skilled in the art may understand that implementation of all or part of steps in the method of the above embodiments may be completed by instructing related hardware through the machine readable instructions. The machine readable instructions, which may be stored in a computer readable storage medium, includes several instructions to make a terminal device (such as a handset, a personal computer, a server or a network device) to perform the method provided by embodiments of the application. The storage medium may be a magnetic disk, an optical disk, a read-only memory (ROM), a random access memory (RAM), etc.

The above are only preferred embodiments of the application and are not intended to limit the scope of the application. Any equivalent structures or equivalent flow modifications made according to the description and the accompanying drawings of the application, or any equivalent structures or equivalent flow modifications applied in other relevant technical fields directly or indirectly are deemed to be covered by the scope of the application.

What is claimed is:

1. A method for sending an email, comprising:
submitting an email body;
packaging the email body and a storage ID of an attachment pre-uploaded into the email by encoding;
determining whether a recipient of the email is a local domain account number; and
when determining that the recipient of the email is the local domain account number, storing the email in a storage server;
when determining that the recipient of the email is not the local domain account number, obtaining the attachment from the storage server based on the storage ID of the attachment, re-encoding the attachment and the email body into the email and sending the email to an external domain server, after the attachment and the email body are re-encoded into the email;
wherein the local domain account number is an internal account number of a local mail-box system.

2. The method according to claim 1, further comprising:
before submitting the email body, uploading the attachment, storing the attachment in the storage server, and recording the storage ID of the attachment.

3. The method according to claim 2, further comprising:
before uploading the attachment, extracting an attachment feature of the attachment;
determining whether the attachment exists in the storage server based on the attachment feature;
when determining that the attachment exists in the storage server, recording the storage ID of the attachment;
when determining that the attachment does not exist in the storage server, uploading the attachment.

4. The method according to claim 1, wherein the email body comprises basic information of the attachment, and the basic information comprises at least one of: file name and size of the attachment, and the storage ID of the attachment.

5. The method according to claim 2, wherein the email body comprises basic information of the attachment, and the basic information comprises at least one of: file name and size of the attachment, and the storage ID of the attachment.

6. The method according to claim 3, wherein the email body comprises basic information of the attachment, and the basic information comprises at least one of: file name and size of the attachment, and the storage ID of the attachment.

7. A terminal for sending an email, comprising a memory and a processor communicating with the memory, wherein the memory stores instructions that when executed by the processor cause the processor to:
submit an email body, and package the email body and a storage ID of an attachment pre-uploaded into the email by encoding;
determine whether a recipient of the email is a local domain account number;
store the email in a storage server when the recipient of the email is the local domain account number; and when the recipient of the email is an external domain account number, obtain the attachment from the storage server based on the storage ID of the attachment, re-encode the attachment and the email body into the email and send the email to an external domain server after re-encoding the attachment and the email body into the email;

wherein the local domain account number is an internal account number of a local mail-box system.

8. The terminal according to claim 7, wherein the instructions further cause the processor to:

upload the attachment, store the attachment in the storage server, and record the storage ID of the attachment.

9. The terminal according to claim 8, wherein the instructions further cause the processor to:

extract an attachment feature of the attachment, determine whether the attachment exists in the storage server based on the attachment feature, and record the storage ID of the attachment when the attachment exists in the storage server, and upload the attachment when the attachment does not exist in the storage server.

\* \* \* \* \*